United States Patent
Aruga et al.

(10) Patent No.: US 11,318,898 B2
(45) Date of Patent: May 3, 2022

(54) ELECTRICAL JUNCTION BOX, MANUFACTURING APPARATUS OF ELECTRICAL JUNCTION BOX, MANUFACTURING METHOD OF ELECTRICAL JUNCTION BOX, AND WIRE HARNESS

(71) Applicant: YAZAKI CORPORATION, Tokyo (JP)

(72) Inventors: Yoshitake Aruga, Utsunomiya (JP); Kuninori Suzuki, Makinohara (JP); Norio Watanabe, Makinohara (JP); Ken Iseki, Nasukarasuyama (JP); Masahito Aoki, Nasukarasuyama (JP); Yuya Azeyanagi, Nasukarasuyama (JP)

(73) Assignee: YAZAKI CORPORATION, Tokyo (JP)

( * ) Notice: Subject to any disclaimer, the term of this patent is extended or adjusted under 35 U.S.C. 154(b) by 15 days.

(21) Appl. No.: 17/133,536

(22) Filed: Dec. 23, 2020

(65) Prior Publication Data
US 2021/0197742 A1    Jul. 1, 2021

(30) Foreign Application Priority Data

Dec. 25, 2019  (JP) .............................. JP2019-233955

(51) Int. Cl.
*H01R 12/00* (2006.01)
*B60R 16/023* (2006.01)
*B60R 16/02* (2006.01)
*H01R 13/514* (2006.01)
*H02G 3/16* (2006.01)

(52) U.S. Cl.
CPC ...... *B60R 16/0238* (2013.01); *B60R 16/0207* (2013.01); *H01R 13/514* (2013.01); *H02G 3/16* (2013.01); *H01R 2201/26* (2013.01)

(58) Field of Classification Search
CPC . B60R 16/0207; B60R 16/0238; H01R 13/46; H01R 13/514; H01R 2201/26; H02G 3/16
USPC ........................................................ 439/76.2
See application file for complete search history.

(56) References Cited

U.S. PATENT DOCUMENTS 6,022,247 A    2/2000  Akiyama et al.
9,991,685 B2 *  6/2018  Muto ................. H02G 3/086
(Continued)

FOREIGN PATENT DOCUMENTS

JP    2011-15467 A    1/2011

*Primary Examiner* — Khiem M Nguyen
(74) *Attorney, Agent, or Firm* — Kenealy Vaidya LLP

(57) ABSTRACT

An electrical junction box includes a frame and a cassette block. The frame has a side wall, the frame having a first opening and a second opening provided at two ends of the side wall. The cassette block is to be attached to the frame from the first opening along a first direction and electric wires are drawn out along a second direction when the cassette block is attached to the frame, the first direction being a direction toward the second opening from the first opening, the second direction being another direction toward the first opening from the second opening. The cassette block has a jig engagement portion configured such that a jig inserted into the cassette block from a side of the second opening engages with the jig engagement portion and the cassette block is drawn into the frame by the jig moving in the first direction.

9 Claims, 17 Drawing Sheets

(56) References Cited

U.S. PATENT DOCUMENTS 10,355,465 B2 * 7/2019 Matsumura ............ H02G 3/086
10,759,358 B2 * 9/2020 Nakano ............... B60R 16/0207

* cited by examiner

ELECTRICAL JUNCTION BOX, MANUFACTURING APPARATUS OF ELECTRICAL JUNCTION BOX, MANUFACTURING METHOD OF ELECTRICAL JUNCTION BOX, AND WIRE HARNESS

CROSS-REFERENCE TO RELATED APPLICATION

The present application claims priority to Japanese Patent Application No. 2019-233955 filed on Dec. 25, 2019, the entire content of which is incorporated herein by reference.

TECHNICAL FIELD

The present invention relates to an electrical junction box including a frame and a cassette block. Further, the present invention relates to a manufacturing apparatus of the electrical junction box and a manufacturing method of the electrical junction box. Further, the present invention relates to a wire harness including the electrical junction box.

BACKGROUND

A related art electrical junction box is mounted on an automobile and supplies power to, for example, various machines (see JP2011-15467A, for example). The electrical junction box includes an electrical junction box body, an upper cover, and a lower cover. A bundle of electric wires is drawn out from the electrical junction box. The bundle of electric wires is a part of a wire harness. The electrical junction box body includes a frame having a shape defined by side walls, a plurality of cassette blocks to be fitted to the frame, and electronic components assembled to the cassette blocks, such as a fuse, a fusible link, and a relay. In the electrical junction box body, terminals (terminal fittings) or bus bars of electric wire terminals to which the electronic components are connected are provided in the cassette blocks. The frame has a first opening at a side from which the bundle of electric wires is drawn out and that is covered by the lower cover, and a second opening at a side opposite to the first opening and covered by the upper cover. A plurality of frame-side lock portions with which the cassette blocks are to be attached to the frame are formed at an inner side of the side wall or a partition wall in the frame. When a direction from the first opening of the frame toward the second opening is defined as a fitting direction and a direction from the second opening toward the first opening is defined as a removing direction, the cassette blocks are fitted to the frame from a side of the first opening along/toward the fitting direction. The cassette blocks are provided with a plurality of block-side lock portions to be fitted to the frame-side lock portions. In a fitted state in which the cassette blocks are fitted to the frame, a plurality of electric wires are drawn out in/toward the removing direction. The plurality of drawn-out electric wires is a part of the bundle of electric wires.

In the related art described above, when the plurality of cassette blocks are being attached to the frame, the electric wires may be damaged or disconnected, and therefore sufficient care must be taken to maintain quality. The reason for this is explained below. In a fitting work, a worker first performs a work of holding the frame with the side of the first opening oriented upward, and then performs a work of temporarily inserting the plurality of cassette blocks into predetermined positions of the frame one by one from the side of first opening. The terms "temporarily inserting/temporary insertion" refer to an insertion up to a state in which the frame-side lock portions and the block-side lock portions are in contact with one another before the frame-side lock portions and the block-side lock portions are fitted. When a temporary insertion of the plurality of cassette blocks into the frame is completed, the electric wires respectively drawn out from the plurality of cassette blocks are present in front of the worker. Next, the worker performs a work of bringing the cassette blocks into a fitted state by pushing the cassette blocks. Although the pushing of the cassette blocks is generally performed with a hand to prevent the electric wires from being damaged or disconnected, it is inevitable to use a hand tool (a pushing jig) when a pushing load is relatively high. When pushing the cassette blocks, the worker pushes a portion of the cassette blocks while trying to avoid pushing the electric wires altogether with the cassette blocks. However, when a hand tool is used, electric wires may be interposed between the hand tool and the cassette blocks since the size of the hand tool is relatively large. When the electric wires cannot be avoided and the hand tool is pushed hard against the cassette blocks with the electric wires being interposed between the hand tool and the cassette blocks, it is likely that the electric wires are damaged or disconnected.

SUMMARY

Illustrative aspects of the present invention provide an electrical junction box configured to prevent the electric wires from being damaged or disconnected in a manufacturing-related work and improve quality thereof. Further, the present invention provides a manufacturing apparatus of the electrical junction box, a manufacturing method of the electrical junction box, and a wire harness.

According to an illustrative aspect of the present invention, an electrical junction box includes a frame and a cassette block from which a plurality of electric wires are drawn out. The frame has a side wall defining a shape of the frame, the frame having a first opening and a second opening provided at two ends of the side wall. The cassette block is configured to be attached to the frame from the first opening along a first direction and the plurality of electric wires are drawn out along a second direction when the cassette block is attached to the frame, the first direction being a direction oriented toward the second opening from the first opening, the second direction being another direction oriented toward the first opening from the second opening. The cassette block has a jig engagement portion. The jig engagement portion is configured such that a jig or device inserted into the cassette block from a side of the second opening along the second direction engages with the jig engagement portion and the cassette block is drawn into the frame by the jig or device inserted into the cassette block moving in the first direction.

According to another illustrative aspect of the present invention, a manufacturing method of an electrical junction box includes holding a frame by a holding device, the frame having a side wall defining a shape of the frame, and the frame having a first opening and a second opening provided at two ends of the side wall, putting a cassette block, from which a plurality of electric wires being drawn out, in the frame from the first opening along a first direction such that the plurality of electric wires are drawn out in a second direction, the first direction being a direction oriented toward the second opening from the first opening, the second direction being another direction oriented toward the first opening from the second opening, and attaching the cassette block to the frame by drawing the cassette block into the frame. The attaching includes a jig or device being inserted into the cassette block from a side of the second opening along the second direction, the jig or device getting engaged with a jig engagement portion of the cassette block after being inserted into the cassette block and the jig or device moving in the first direction, thereby attaching the cassette block to the frame.

According to yet another illustrative aspect of the present invention, a wire harness includes the electrical junction box provided at a terminal of the wire harness and is to be routed in an automobile.

According to the electrical junction box, the manufacturing apparatus of the electrical junction box, and the manufacturing method of the electrical junction box of the prevent invention, electric wires can be prevented from being damaged or disconnected in a manufacturing-related work and quality can be improved. Further, according to the wire harness of the present invention, a better wire harness can be provided by including the electrical junction box having the above effects. Other aspects and advantages of the invention will be apparent from the following description, the drawings and the claims.

DESCRIPTION OF EMBODIMENTS

An electrical junction box includes a frame and a plurality of cassette blocks. The frame has a shape defined by a side wall and has a first opening and a second opening at two ends of the side wall. The cassette blocks are fitted to the frame from aside of the first opening, and a plurality of electric wires are drawn out in a direction opposite to a fitting direction. The cassette blocks have one or more jig engagement portions. A jig or a device inserted into a cassette block from a side of the second opening of the frame engages with the jig engagement portion, and then, when the jig or the device engaged with the jig engagement portion is moved in a drawn-out direction (second direction) opposite to an insertion direction (first direction), the cassette block is drawn into the frame.

An manufacturing apparatus of electrical junction box includes a holding device configured to hold the frame, and a drawing-in device that brings the cassette blocks into a fitted state by drawing the cassette blocks into the frame. An manufacturing method of electrical junction box includes a first step of holding the frame by the holding device, a second step of setting (temporarily inserting) cassette blocks into the frame, and a third step of bringing the cassette blocks into a fitted state by drawing the cassette blocks into the frame.

Figure 1:
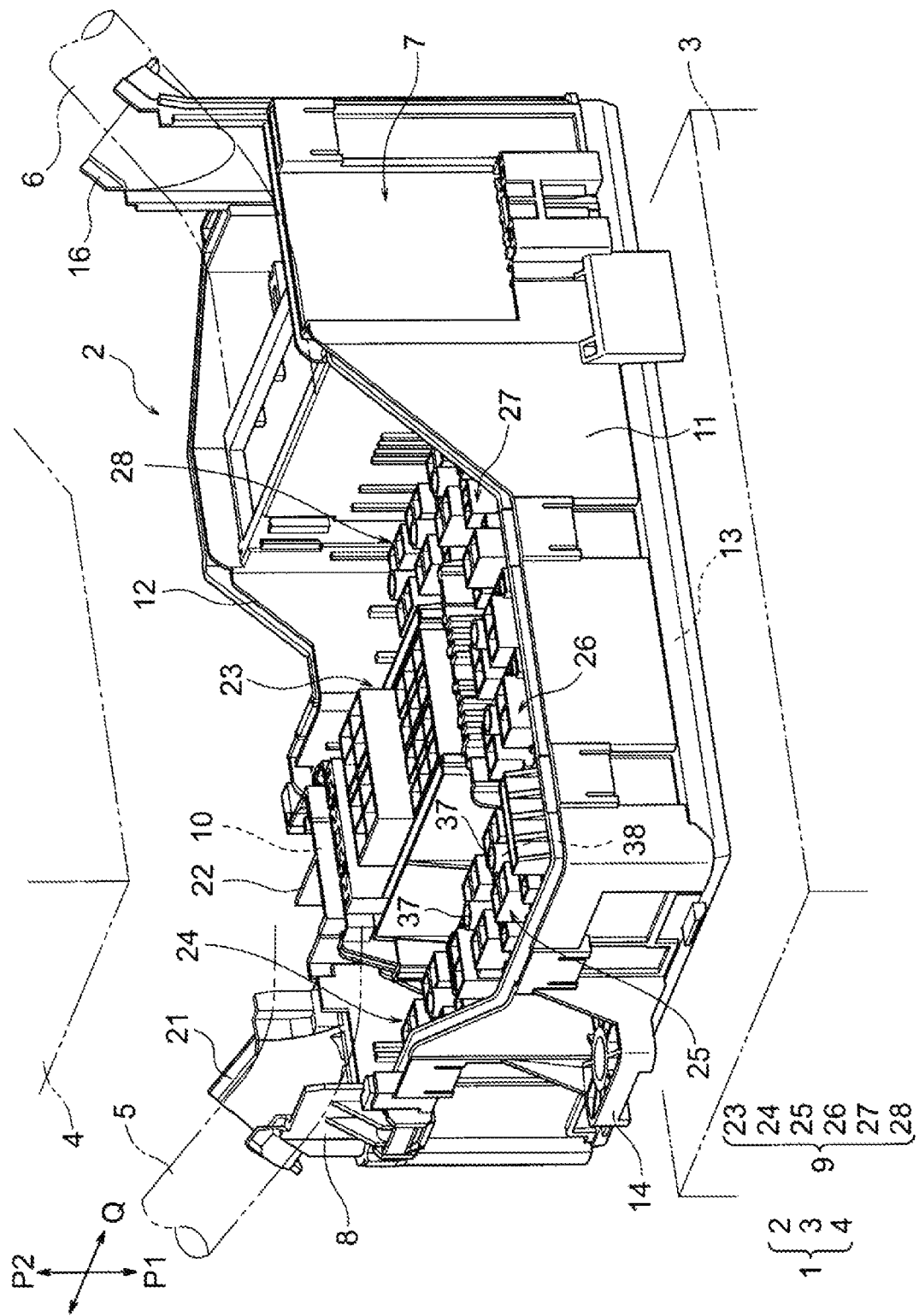
FIG. 1 is a configuration diagram showing an electrical junction box according to an embodiment of the present invention.
Figure 2:
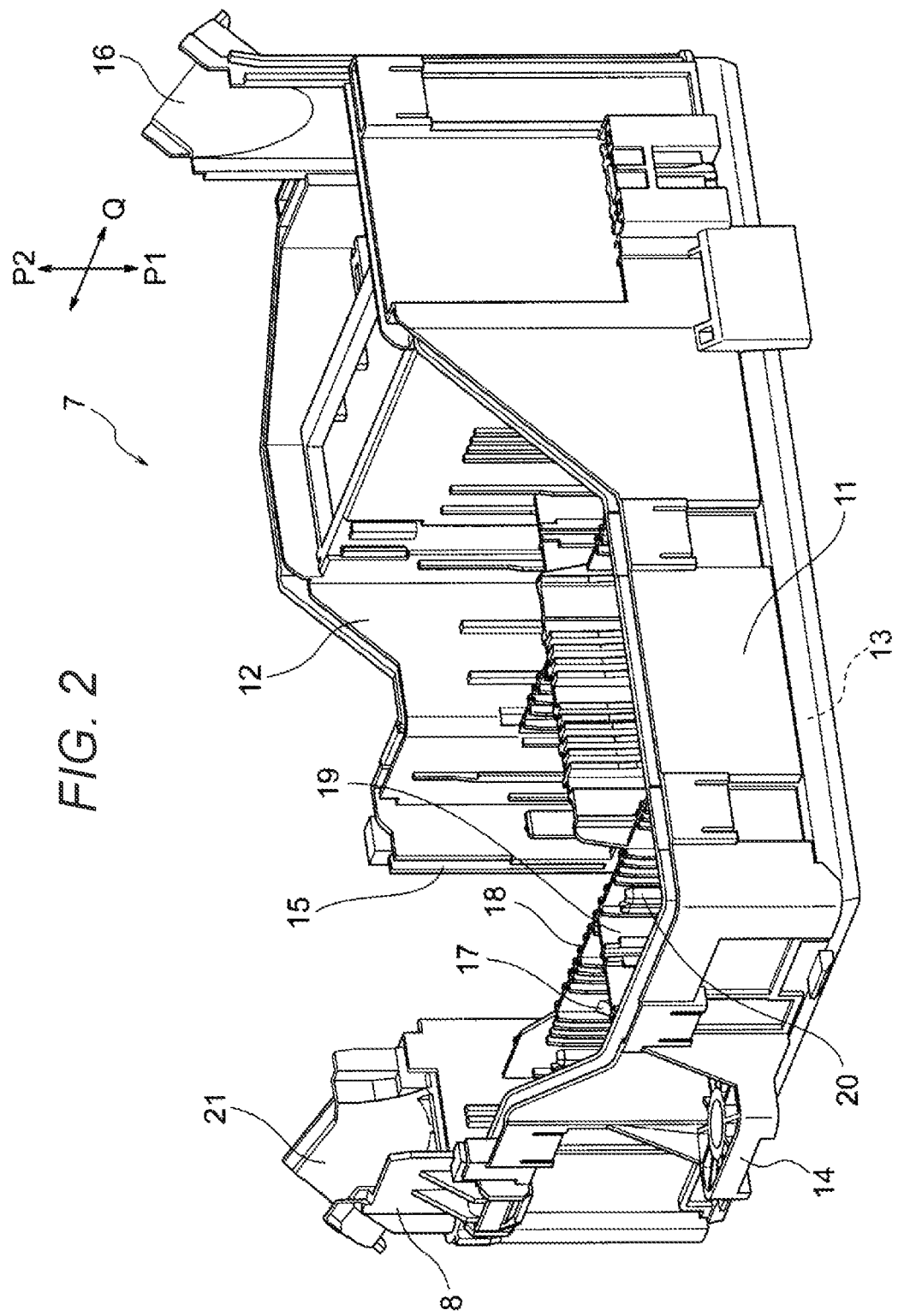
FIG. 2 is a perspective view showing a frame.
Figure 3:
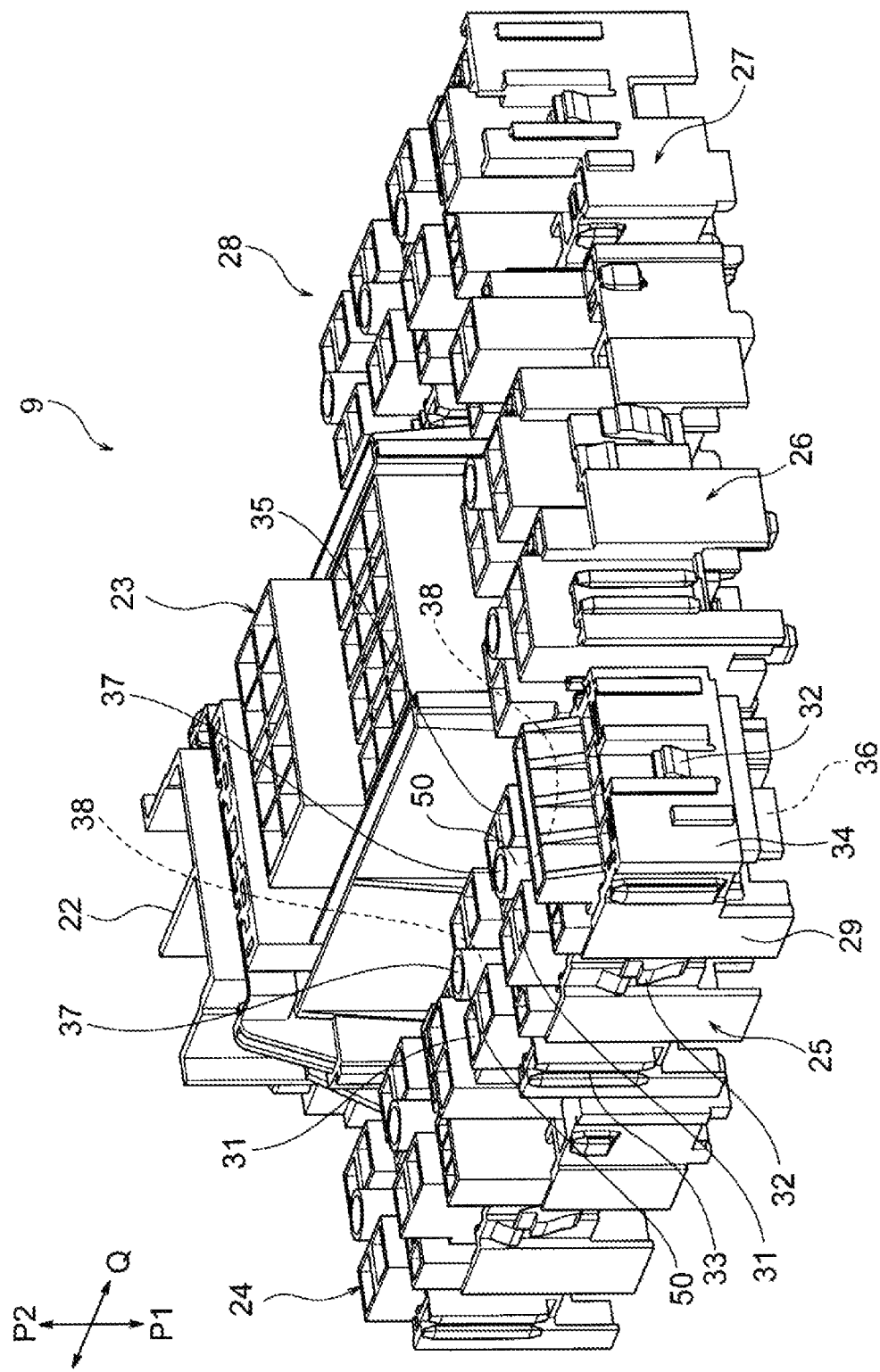
FIG. 3 is a perspective view showing a plurality of cassette blocks.
Figure 4:
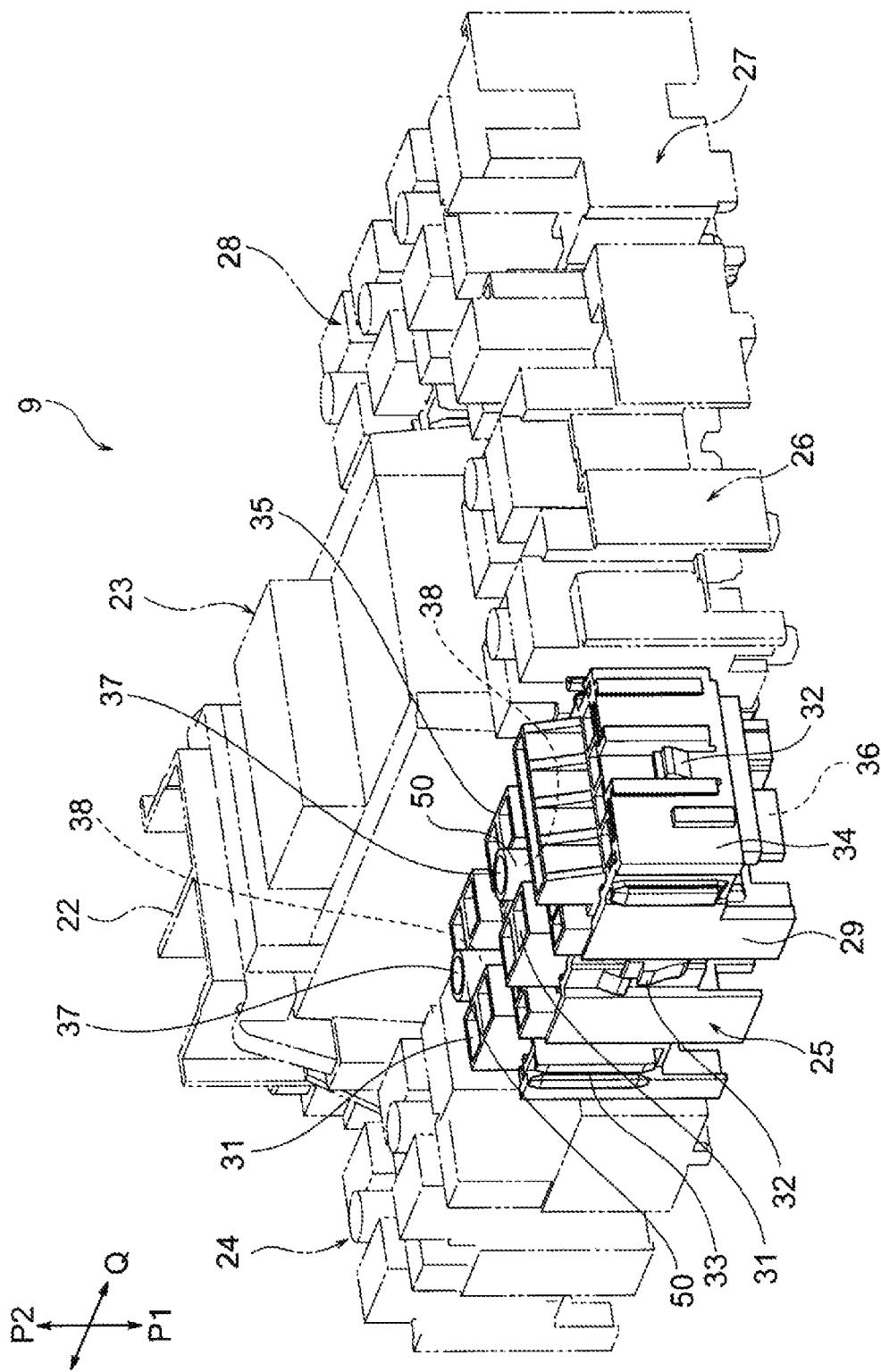
FIG. 4 is a perspective view showing, with solid lines, one of the plurality of cassette blocks shown in FIG. 3.
Figure 5:
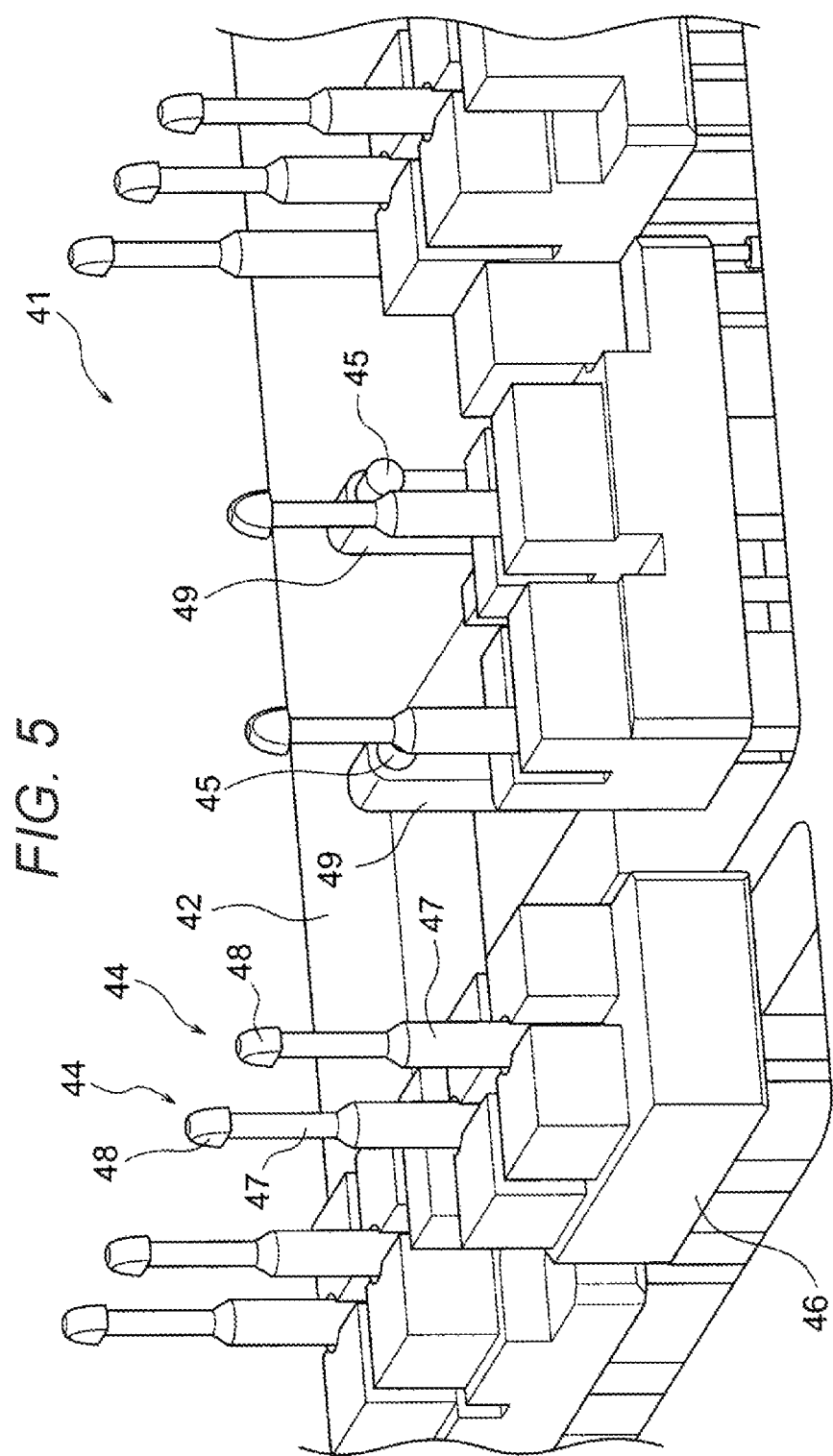
FIG. 5 is a perspective view showing a drawing-in device.
Figure 6:
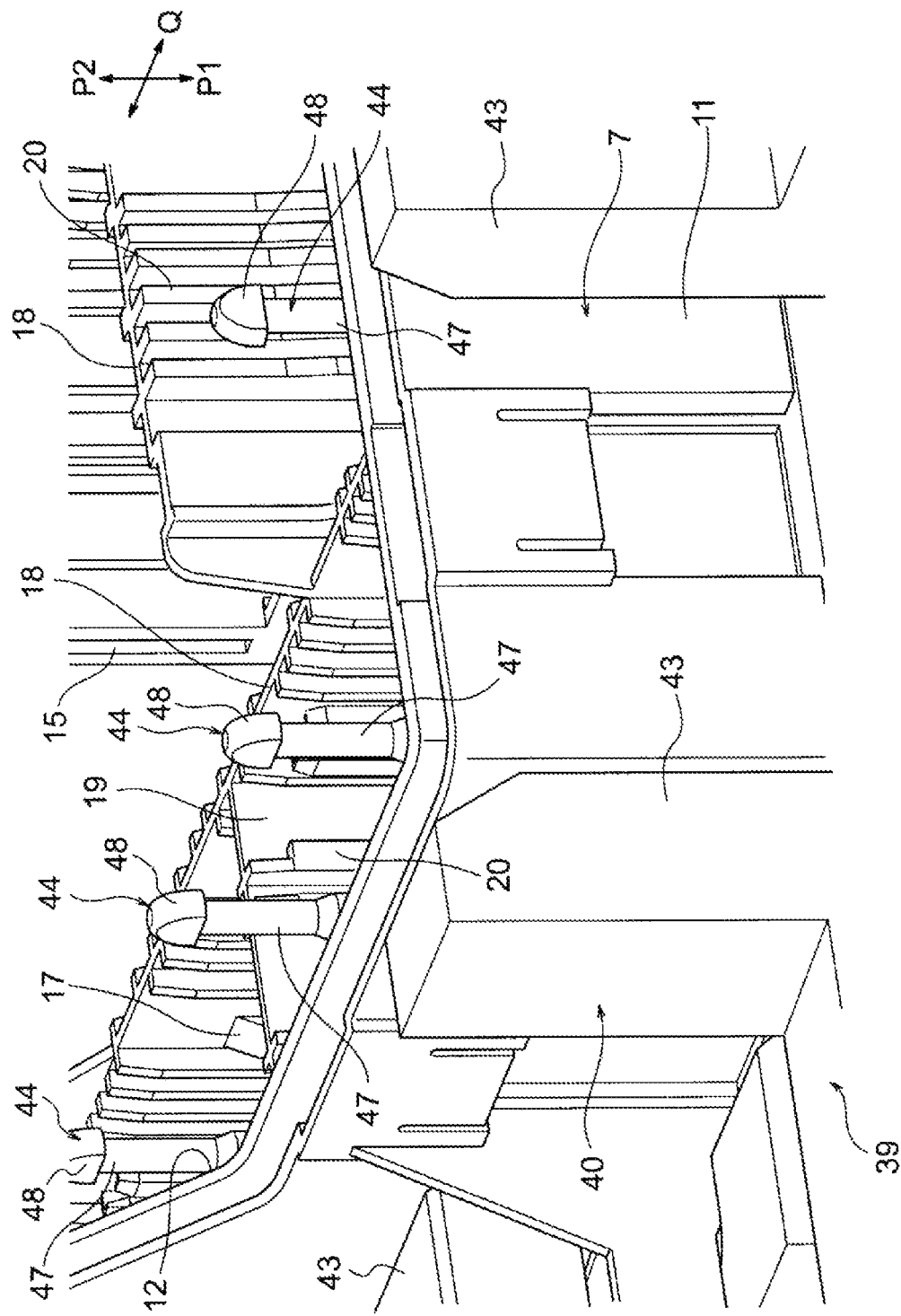
FIG. 6 is a perspective view showing the frame, a holding device, and the drawing-in device.
Figure 7:
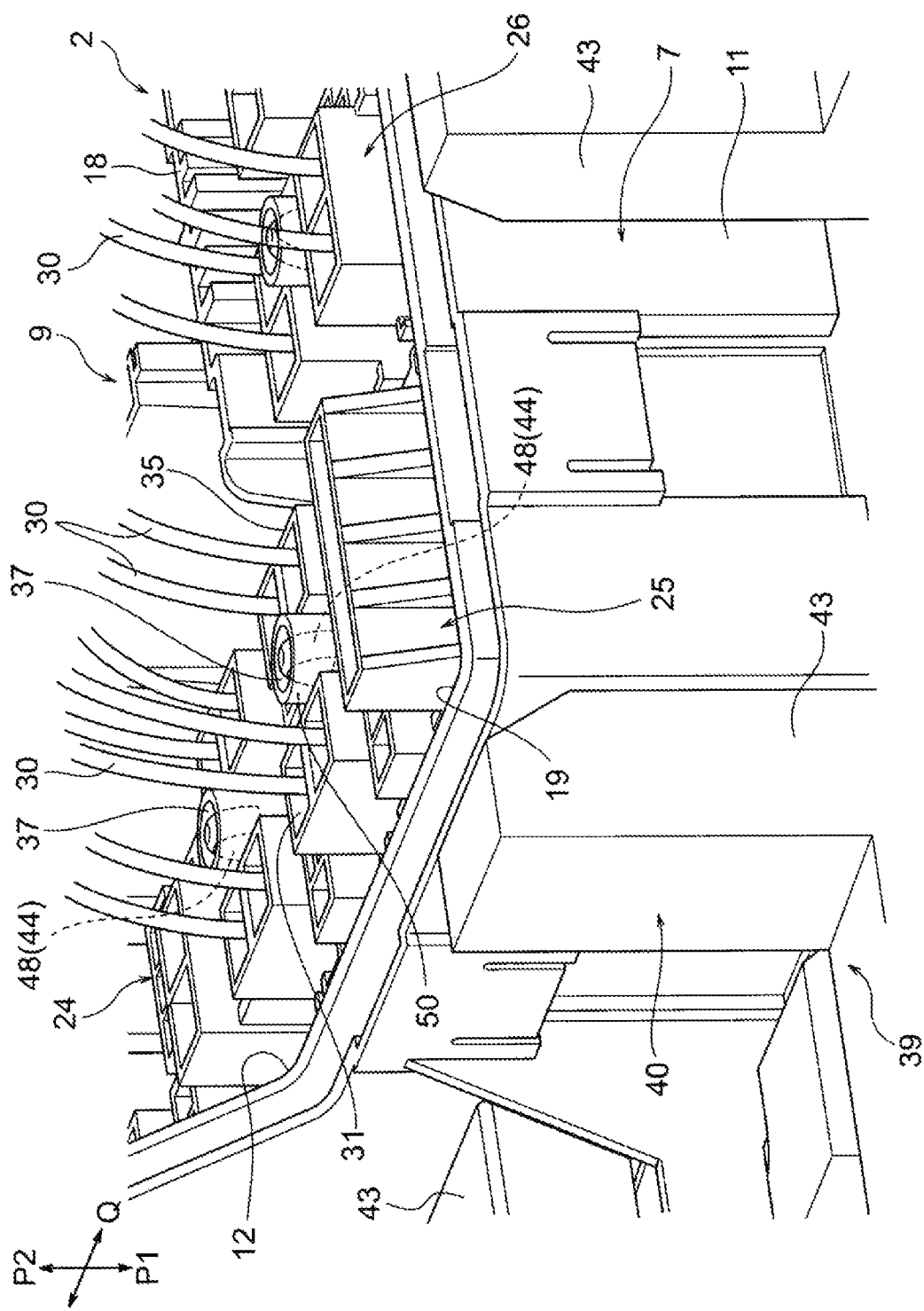
FIG. 7 is a perspective view showing a state in which the cassette blocks are temporarily inserted.
Figure 8:
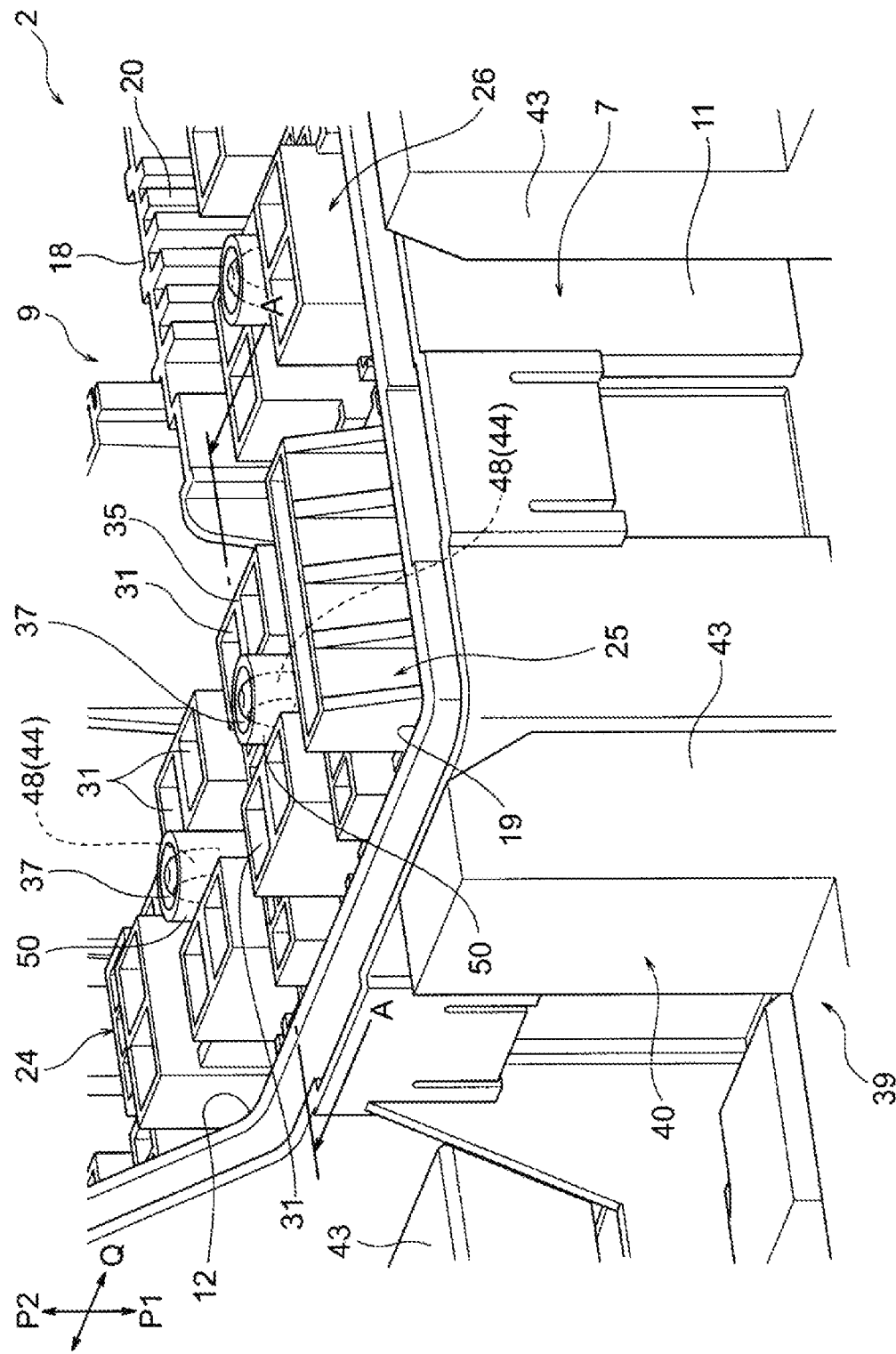
FIG. 8 is a perspective view showing a temporarily inserted state in which electric wires shown in FIG. 7 are omitted.
Figure 9:
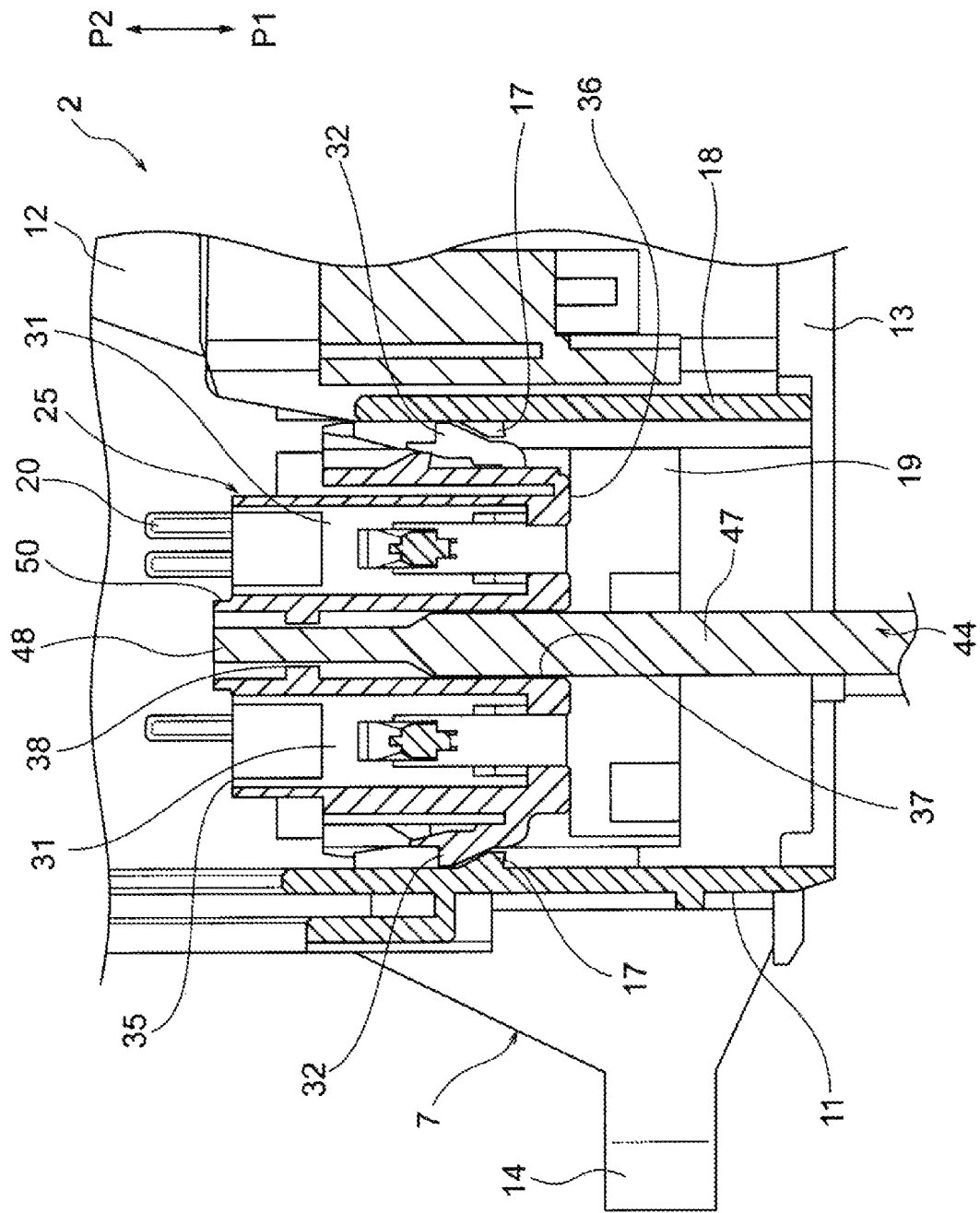
FIG. 9 is a cross-sectional view taken along a line A-A in FIG. 8.
Figure 10:
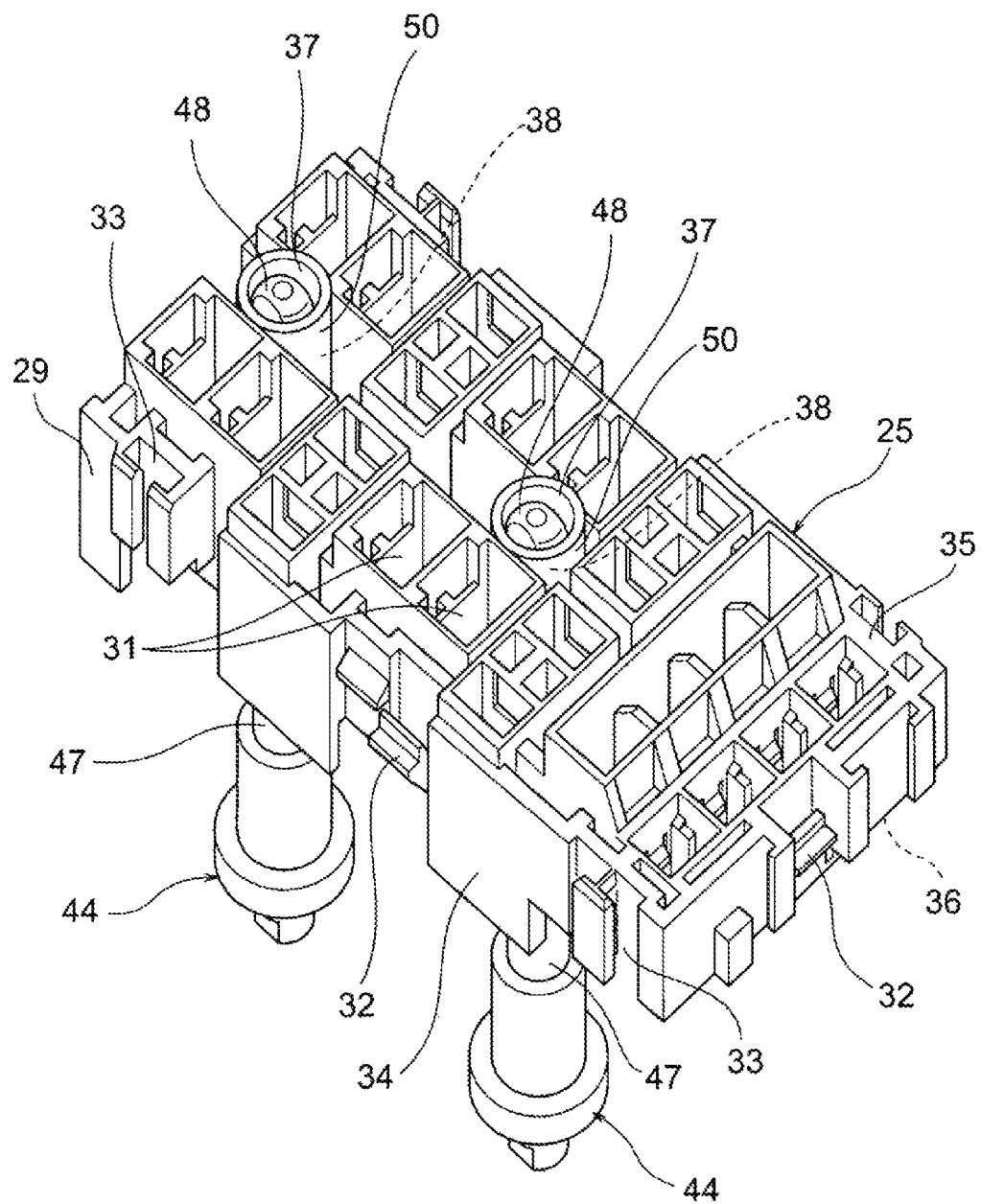
FIG. 10 is a perspective view showing a relationship between the cassette blocks in a temporarily inserted state and the drawing-in device.
Figure 11:
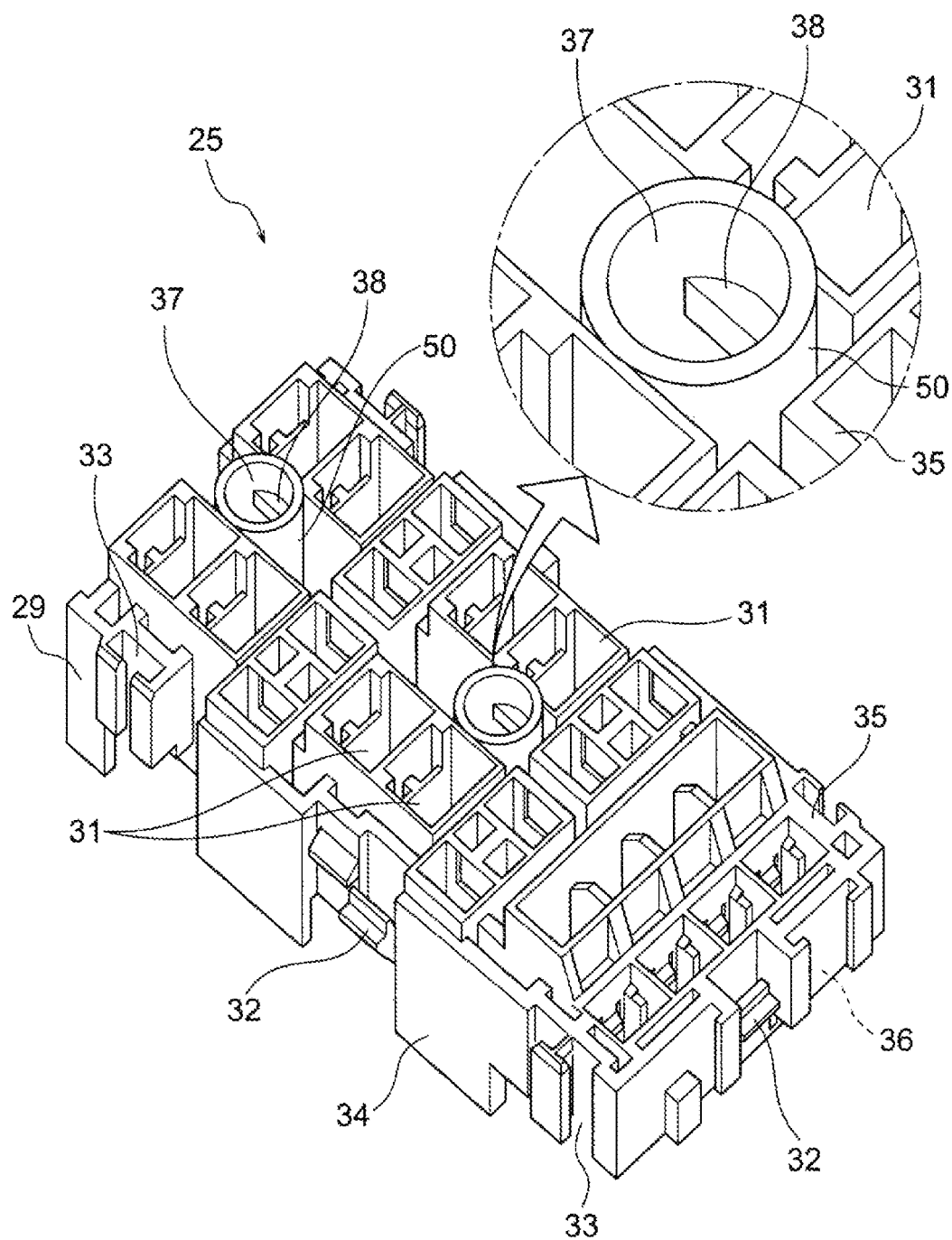
FIG. 11 is a perspective view (within a circle is an enlarged view showing a jig engagement portion) showing a state in which the drawing-in device in FIG. 10 is omitted.
Figure 12:
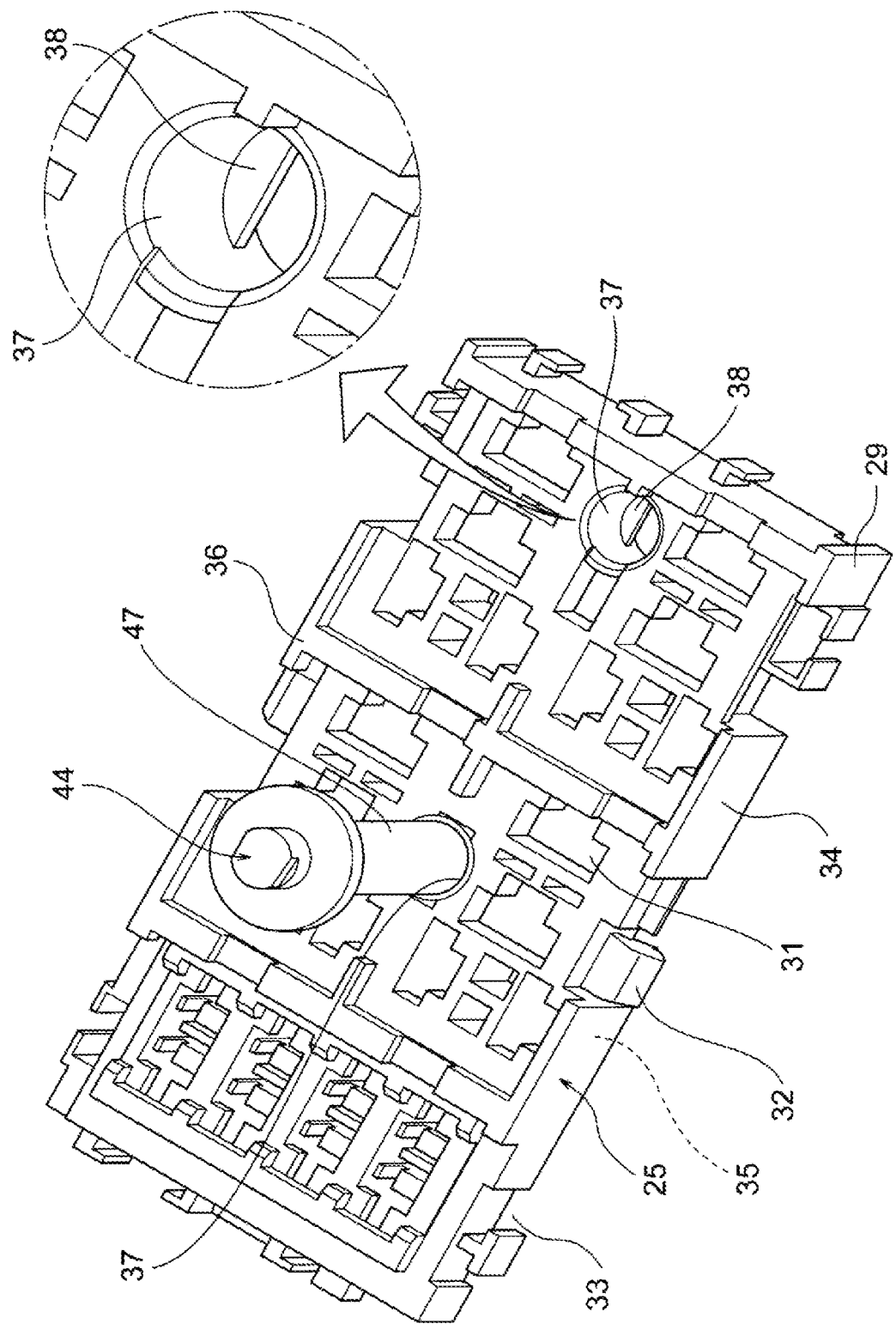
FIG. 12 is a perspective view (within a circle is an enlarged view showing the jig engagement portion) as viewed from a direction opposite to a direction in FIG. 10.
Figure 13:
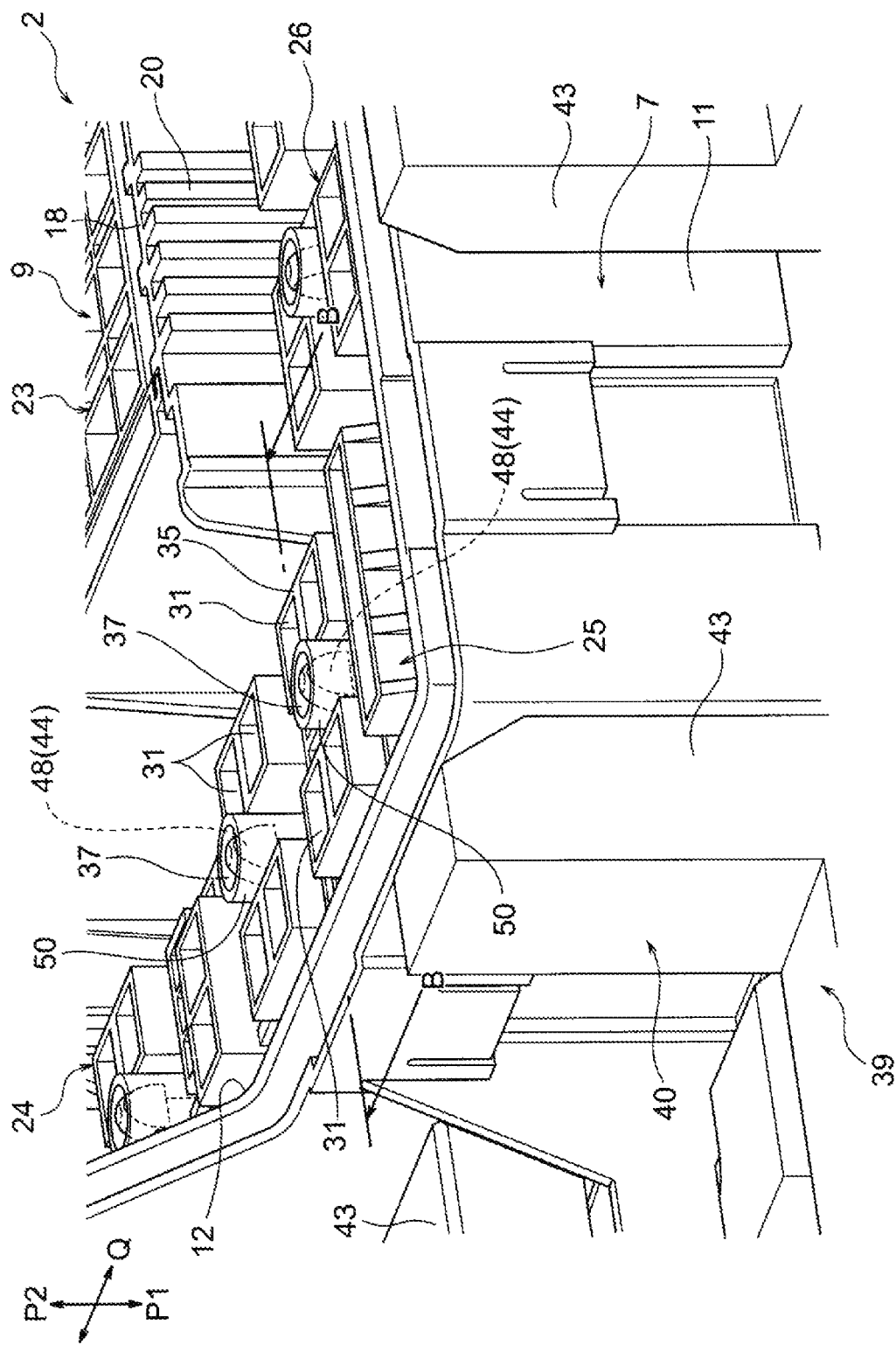
FIG. 13 is a perspective view showing a state in which the cassette blocks are fitted.
Figure 14:
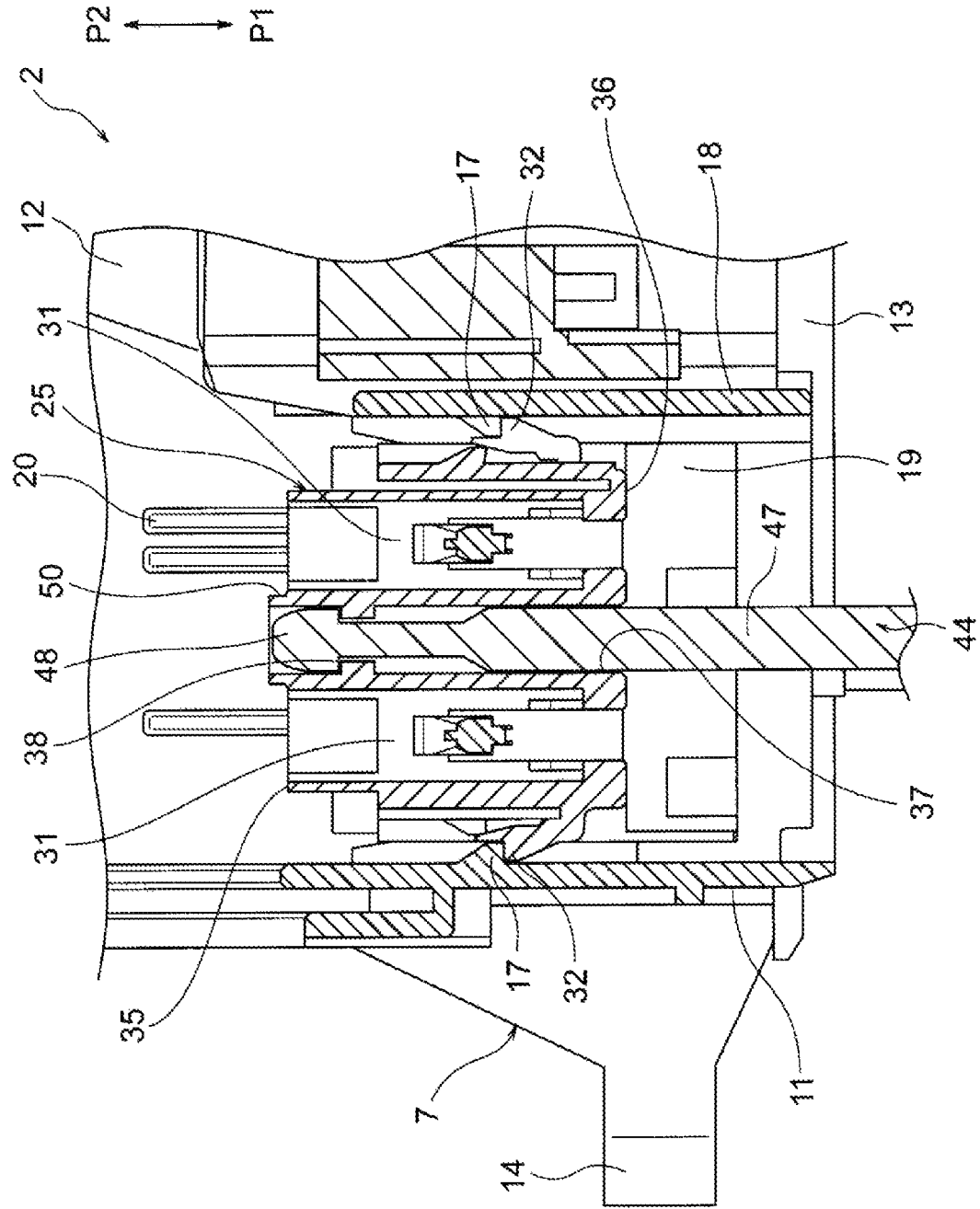
FIG. 14 is a cross-sectional view taken along a line B-B in FIG. 13.
Figure 15:
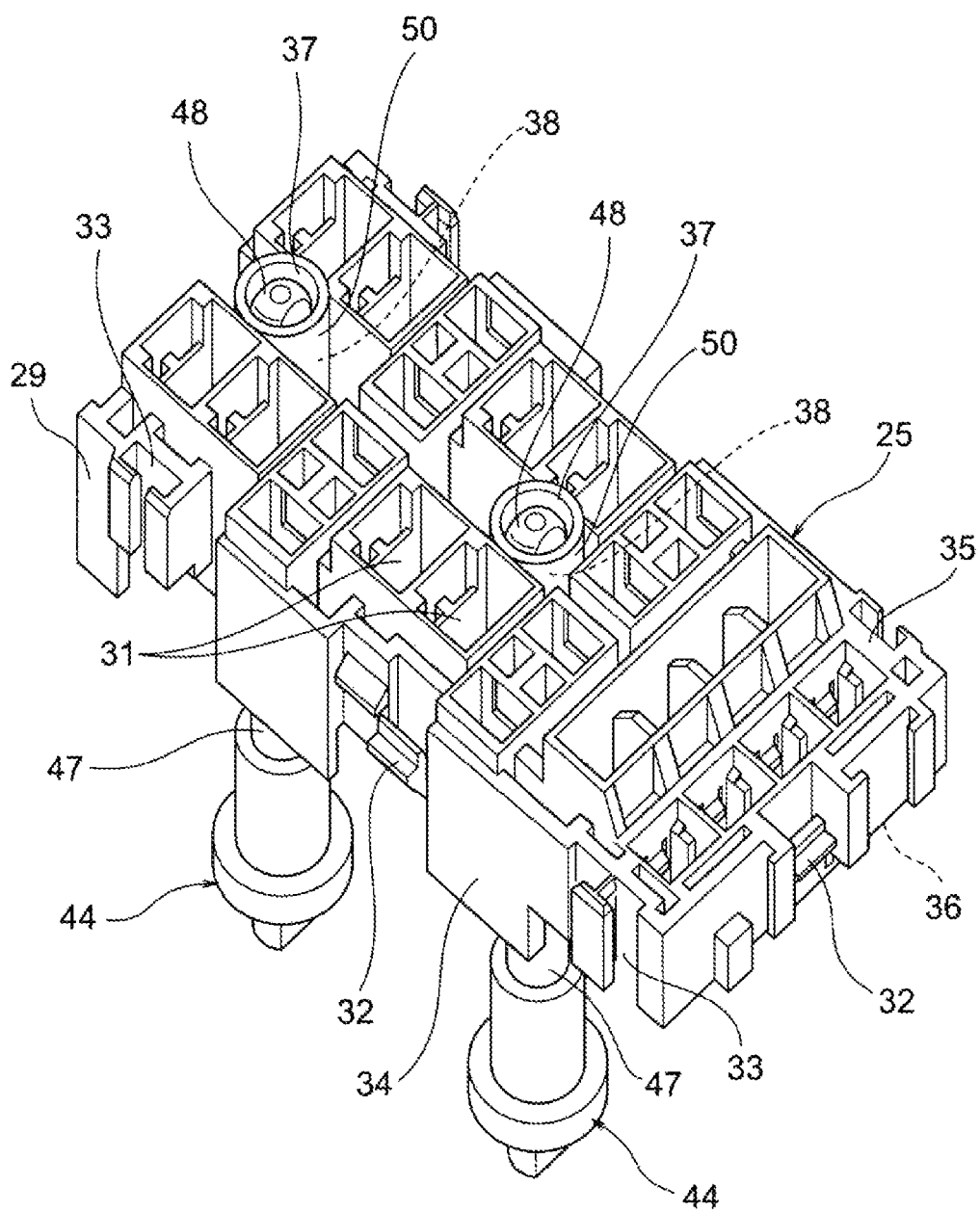
FIG. 15 is a perspective view showing a relationship between the cassette blocks in a fitted state and the drawing-in device.
Figure 16:
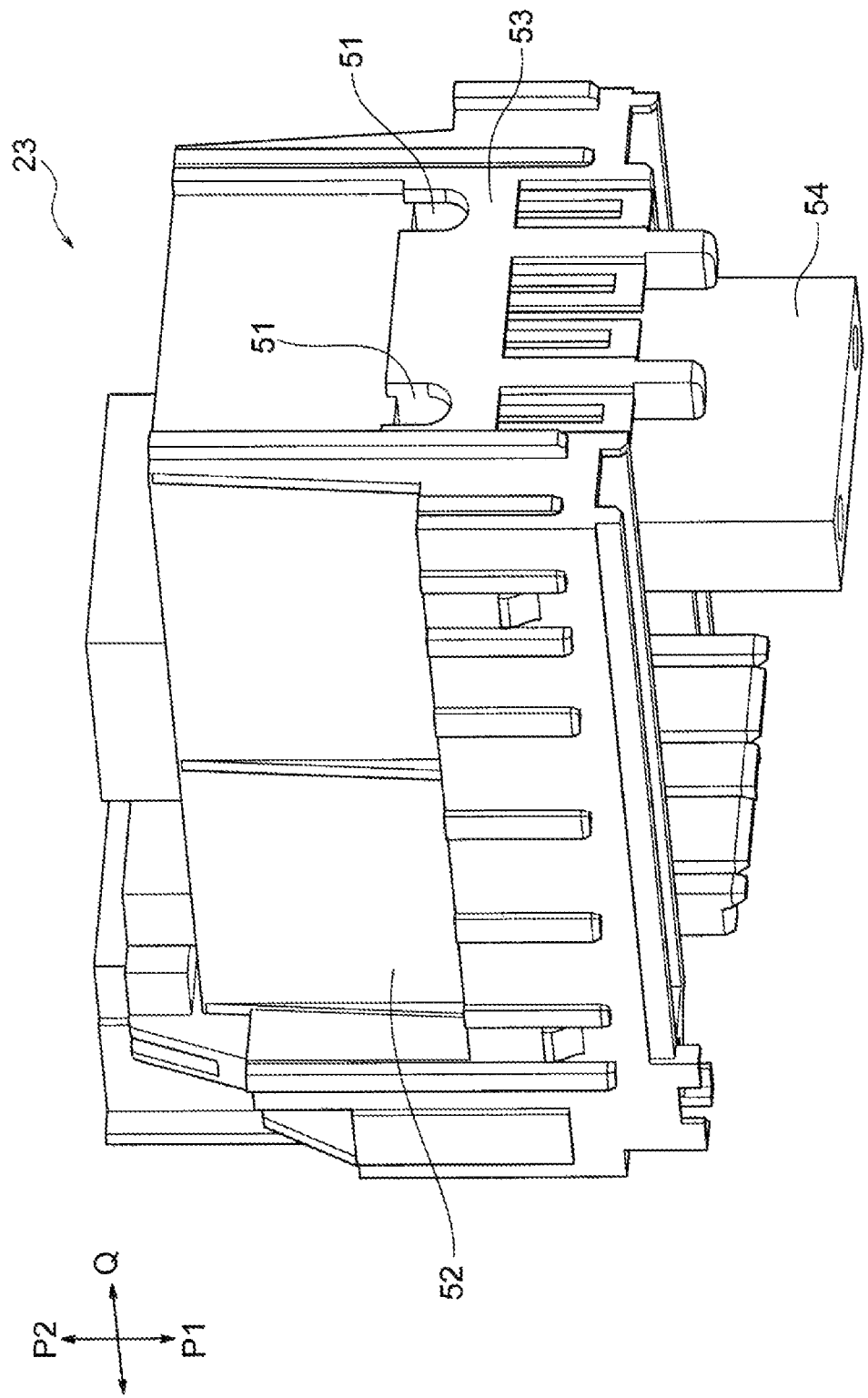
FIG. 16 is a perspective view showing a relationship between the cassette blocks in a temporarily inserted state and the drawing-in device (before a sliding movement)
Figure 17:
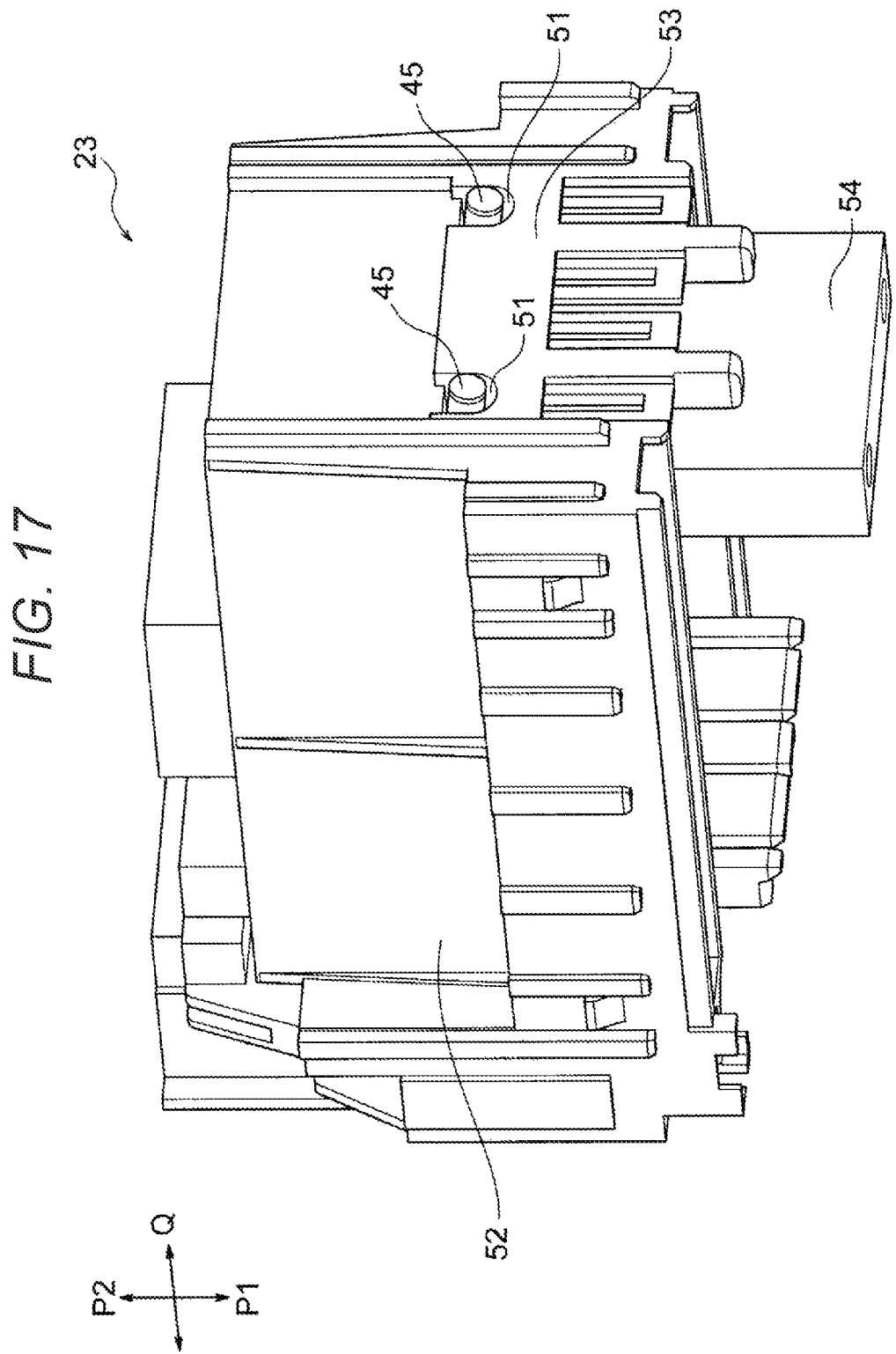
FIG. 17 is a perspective view showing a relationship between the cassette blocks in a temporarily inserted state and the drawing-in device (after the sliding movement).

Hereinafter, embodiments will be described with reference to drawings. FIG. 1 is a configuration diagram showing an electrical junction box according to an embodiment of the present invention. FIG. 2 is a perspective view showing a frame. FIGS. 3 and 4 are perspective views showing a plurality of cassette blocks. FIG. 5 is a perspective view showing a drawing-in device. FIG. 6 is a perspective view showing the frame, a holding device, and the drawing-in device. FIGS. 7 and 8 are perspective views showing a state in which the cassette blocks are temporarily inserted. FIG. 9 is a cross-sectional view taken along a line A-A in FIG. 8. FIGS. 10 to 12 are perspective views showing a relationship between the cassette blocks in a temporarily inserted state and the drawing-in device. FIG. 13 is a perspective view showing a state in which the cassette blocks are fitted. FIG. 14 is a cross-sectional view taken along a line B-B in FIG. 13. FIG. 15 is a perspective view showing a relationship between the cassette blocks in a fitted state and the drawing-in device. FIGS. 16 and 17 are perspective views showing a relationship between the cassette blocks in a temporarily inserted state and the drawing-in device (before and after a sliding movement).

In FIG. 1, an electrical junction box 1 according to the present embodiment that is mounted on an automobile supplies power to various devices and the like. The electrical junction box 1 includes an electrical junction box body 2, an upper cover 3, and a lower cover 4. FIG. 1 shows a state in which components are aligned on a manufacturing surface (when the electrical junction box 1 is mounted to the automobile, for example, the upper cover 3 is to be located at an upper side of the figure). Bundles of electric wires 5 and 6 are drawn out from the electrical junction box 1. The bundles of electric wires 5 and 6 are a part of a wire harness (not shown). The wire harness (not shown) is routed in the automobile along a predetermined path. Hereinafter, each component will be described, and thereafter a manufacturing apparatus and a manufacturing method will be described.

In FIG. 1, the electrical junction box body 2 includes a frame 7 formed of a resin, a side cover 8 formed of the same type of resin, a group of cassette blocks 9, an external connection portion 10, and a plurality of several types of electronic components (fuses, relays, etc. (not shown)). The electrical junction box body 2 is manufactured by a manufacturing apparatus 39 (see FIG. 6) to be described later. The electrical junction box body 2 is manufactured according to a manufacturing method (a first step to a third step) to be described later. The electrical junction box body 2 is manufactured without performing a pushing work with a hand or a hand tool as in the related art.

In FIGS. 1 and 2, the frame 7 is a resin molded product, and is formed into a shape defined by a side wall 11. The frame 7 has a first opening 12 and a second opening 13 at two ends of the side wall 11. The first opening 12 is formed as an opening portion provided at an end portion (second end portion) of the frame 7 at a side in a direction (second direction) of an arrow P2 in the figure. The second opening 13 is formed as an opening portion provided at another end portion (first end portion) of the frame 7 at another side in another direction (first direction) of an arrow P1 in the figure. When the second end portion at a second opening 13 side is set as a reference position, the side wall 11 is formed such that a height (a dimension along a direction of the arrows P1 and P2) thereof is partially different. In other words, the side wall 11 is formed such that the second opening 13 is opened in a planar manner and the first opening 12 is opened in anon-planar manner. A plurality of lock portions (not shown) to be locked to the upper cover 3 and the lower cover 4 are formed on the side wall 11. The side wall 11 is formed with a fixed leg portion 14 for fixing the frame 7 to a vehicle body or the like an attachment part (reference numeral omitted) for attaching the frame 7 to the side cover 8, an attachment portion 15 for attaching the frame 7 to the external connection portion 10, and a bundle of electric wires guide portion 16. In addition, a plurality of frame-side lock portions 17 (see FIG. 9) are formed on an inner surface of the side wall 11.

A plurality of partition walls 18 are formed at an inner side of the side wall 11 (inside the frame 7). A plurality of housing accommodation portions 19 are formed at the same inner side. The plurality of partition walls 18 are formed so as to partition accommodation portions for the cassette blocks (a first relay block 24, a second relay block 25 . . . to be described later). The plurality of partition walls 18 are formed with a plurality of guide ribs 20 that function as guide portions when the cassette blocks are being attached. The guide ribs 20 are formed so as to extend straight along the direction of the arrows P1 and P2. The guide ribs 20 are formed at the inner side of the side wall 11 in a similar manner. The frame-side lock portions 17 (see FIG. 9) are formed on the plurality of partition walls 18 in a similar manner to those formed on the inner surface of the side wall 11. The accommodation portions for the cassette blocks are formed with stopper portions (reference numeral omitted) that prevent the cassette blocks from moving in the first direction (the direction of the arrow P). The frame-side lock portions 17 are configured such that the cassette blocks accommodated in the accommodation portions are engaged to the frame-side lock portions 17. The frame-side lock portions 17 prevent the cassette blocks from escaping in the direction of the arrow P2. The bundle of electric wires guide portion 16 is formed into a substantially semi-cylindrical shape serving as a drawn-out portion for the bundle of electric wires 6. A portion that has the same function as the bundle of electric wires guide portion 16 is also formed at the side cover 8. A bundle of electric wires guide portion 21 formed at the side cover 8 is formed as a drawn-out portion for the bundle of electric wires 5. The attachment portion 15 is formed as an attachment portion for a holder 22 (see FIG. 3). The holder 22 is assembled to a fuse cassette block (fuse block 23) to be described later. The external connection portion 10 is provided at a portion of the holder 22. The external connection portion 10 is formed such that electric wires from a power supply (not shown) can be connected thereto.

In FIGS. 1, 3, and 4, the group of cassette blocks 9 refers to all cassette blocks accommodated in the frame 7. The group of cassette blocks 9 in the present embodiment includes one fuse cassette block (fuse block 23) and five relay cassette blocks (first relay block 24 to fifth relay block 28). Hereinafter, the second relay block 25 (a cassette block shown in solid lines with reference to FIG. 4) will be described as a representative example of the relay cassette blocks. The fuse cassette block, that is, the fuse block 23 will be described in the manufacturing method to be described later.

In FIG. 3, FIG. 4, and FIGS. 7 to 11, the second relay block 25 is a relay cassette block as described above, and includes a housing 29 formed of a resin and a plurality of terminal fittings (not shown). The terminal fittings (not shown) are provided at terminals of electric wires 30 of the bundle of electric wires 5 and 6. The terminal fittings (not shown) are held by being inserted into a predetermined cavity 31 of the housing 29. That is, the terminal fittings are accommodated in the cavity 31.

The housing 29 is formed into a substantially rectangular block shape (substantially rectangular parallelepiped shape). The housing 29 has a plurality of cavities 31. The cavity 31 is formed as a connection destination of a relay (not shown). The cavity 31 has a known shape. An outer shape (contour) of the housing 29 as viewed in a plane is fixed. This is because even when another second relay block 25 in which the number of cavities 31 is changed is adopted, the second relay block 25 can be accommodated without changing a shape of the frame 7.

The housing 29 has a side portion 34 provided with a plurality of block-side locking portions 32 and guide grooves 33, an electric wire draw-out portion 35, and an electronic component connection portion 36. The housing 29 is formed into a substantially rectangular block shape. The block-side lock portion 32 is configured to be attached to the frame-side lock portion 17 of the frame 7 such that the second relay block 25 is prevented from escaping in the second direction (direction of the arrow P2). The guide grooves 33 is configured to be guided by being engaged with the guide ribs 20 of the frame 7. The guide grooves 33 are provided corresponding to a shape, the number, and an arrangement of the guide ribs 20. The electric wire draw-out portion 35 is a portion from which the electric wires 30 are drawn out. The electric wire draw-out portion 35 is provided at the side of the frame 7 where the first opening 12 is provided. The electronic component connection portion 36 is provided at an opposite side of the electric wire draw-out portion 35 and serves as a portion to which an electronic component such as a relay (not shown) is connected. The electronic component connection portion 36 is provided at the side of the frame 7 where the second opening 13 is provided.

In FIGS. 7 to 15, two hole portions 37 (the number or an arrangement of the hole portions 37 is an example) are formed in the housing 29. The hole portion 37 runs through the housing 29. Specifically, the hole portion 37 runs through the housing 29 forming an opening each for the electric wire draw-out portion 35 and the electronic component connection portion 36. The hole portion 37 is formed to be a circular through-hole. The hole portion 37 extends straight. The hole portion 37 is an insertion portion into which a drawing-in pin 44 (see FIG. 5) of the manufacturing apparatus 39 (see FIG. 6) to be described later is to be inserted when the second relay block 25 is attached in the frame 7. The hole portion 37 can be used as a portion for detecting an erroneous assembly or the like (for example, an erroneous assembly can be detected when an arrangement of the hole portions 37 of the first relay block 24 or the third relay block 25 is different from that of the second relay block 25). The hole portion 37 is formed with an annular protruding portion (annular protruding wall) 50 having a relatively low height so as to separate the electric wires 30 drawn out from the electric wire draw-out portion 35 and the drawing-in pin 44. The annular protruding portion 50 has a height that does not interfere with an insertion work of the electric wires 30, that is, a low height as described above.

A jig engagement portion 38 is formed on an inner surface of the hole portion 37. The jig engagement portion 38 is a portion with which the drawing-in pin 44 engages. The jig engagement portion 38 is formed in an intermediate portion inside the hole portion 37 and is formed at a side close to the electric wire draw-out portion 35 (just an example). The jig engagement portion 38 includes a pair of protruding portions protruding from an inner surface of the hole portion 37 toward the center of the hole portion 37. The jig engagement portion 38 is formed to allow a tip end portion 48 of the drawing-in pin 44 to pass through a space between the pair of the protruding portions. The jig engagement portion 38 is formed to be an engagement portion that engages with the tip end portion 48 when the drawing-in pin 44 is rotated by 90 degrees after the tip end portion 48 of the drawing-in pin 44 passes through the protruding portions inside the hole portion 37. Although the jig engagement portion 38 is an engagement portion formed for the drawing-in pin 44 of the manufacturing apparatus 39 according to the present embodiment, the jig engagement portion 38 may be an engagement portion of a simple jig. A jig engagement portion of the fuse cassette block (fuse block 23) is formed in a cave portion that passes through a side wall of a housing of the cassette block (to be described later with reference to FIGS. 16 and 17). A drawing-in pin 45 to be described later slides into and engages with the cave portion.

In FIG. 1, the upper cover 3 is a resin molded product and covers the side of the frame 7 where the second opening 13 is provided. The lower cover 4 is also a resin molded product and covers the side of the frame 7 where the first opening 12 is provided. The upper cover 3 and the lower cover 4 each includes a plurality of lock portions to be fitted to lock portions formed on an outer surface of the side wall 11 of the frame 7. A known structure is adopted for the upper cover 3 and the lower cover 4, and a detailed description thereof will be omitted here.

The electrical junction box body 2 in FIG. 1 is manufactured by the manufacturing apparatus 39 in FIG. 6. The manufacturing apparatus 39 includes a holding device 40 and a drawing-in device 41 (see FIG. 5). The holding device 40 is a device that holds the frame 7. The holding device 40 includes a holding table 42 (see FIG. 5) on which the frame 7 is to be placed, and a plurality of holding blocks 43 that hold the frame 7. A plurality of holding blocks 43 of various types are prepared corresponding to a shape of the side wall 11 of the frame 7. The holding table 42 also includes the drawing-in device 41 in addition to the plurality of holding blocks 43.

The direction of the arrow P1 in the figure is defined as a fitting direction (first direction), and the direction of the arrow P2 is defined as a removing direction (second direction). The direction of the arrow P1 that is the fitting direction is a direction from the first opening 12 toward the second opening 13 of the frame 7. The direction of the arrow P2 that is the removing direction is a direction from the second opening 13 toward the first opening 12. The group of cassette blocks 9 in FIG. 3 is put in the frame 7 in the direction of the arrow P1 that is the fitting direction. In addition, a direction of an arrow Q is defined as a direction orthogonal to the direction of the arrow P1 that is the fitting direction and the direction of the arrow P2 that is the removing direction.

In FIGS. 5 and 6, the drawing-in device 41 includes a mechanism (not shown) that is movable in the direction of the arrow P1 that is the fitting direction and the direction of the arrow P2 that is the removing direction, a plurality of drawing-in pins 44 (jigs or devices) that performs a rotational movement, and a pair of drawing-in pins 45 (jigs or devices) that performs a sliding movement. The drawing-in device 41 is provided for accommodating the group of cassette blocks 9 in FIG. 3 in the frame 7, and can draw the group of cassette blocks 9 into the frame 7.

The plurality of drawing-in pins 44 are assembled to a plurality of pin bases 46. The plurality of pin bases 46 are provided corresponding to the relay cassette blocks (the first relay block 24 to the fifth relay block 28). The rotational movement described above refers to a movement of rotating the plurality of drawing-in pins 44 by 90 degrees about an axis along the direction of the arrow P1 that is the fitting direction and the direction of the arrow P2 that is the removing direction. The drawing-in device 41 has a mechanism for performing a rotational movement.

The plurality of drawing-in pins 44 each has a shaft portion 47 formed in a stepped pin shape (columnar shape having a stepped portion) and the tip end portion 48 provided at a tip end of the shaft portion 47. The drawing-in pins 44 are formed into a shape as shown in the figure. The shaft portion 47 is configured such that the shaft portion 47 is to be inserted into the hole portion 37 of the second relay block 25. The tip end portion 48 has a substantially semicircular shape when viewed from one angle and is flat when viewed from another angle. The tip end portion 48 can pass through the jig engagement portion 38 of the hole portion 37 (can pass through the space between the pair of protruding portions). When the tip end portion 48 is rotated by 90 degrees after the tip end portion 48 passes through the jig engagement portion 38, the tip end portion 48 engages with the jig engagement portion 38.

A pair of drawing-in pins 45 are attached to a pair of brackets 49. The pair of drawing-in pins 45 has a short pin shape protruding in the direction of the arrow Q (protruding in a direction orthogonal to the first and second directions). The pair of drawing-in pins 45 are inserted into and engage with the cave portions (jig engagement portions 51, see FIGS. 16 and 17) in the fuse cassette block (the fuse block 23). The pair of brackets 49 has a mechanism that enables movement in the direction of the arrow P1 and the direction of the arrow P2 and enables slide movement in the direction of the arrow Q. The jig engagement portions 51 to which the pair of drawing-in pins 45 are engaged are not limited to cave portions, and may be portions the drawing-in pins 45 can engage with, such as stepped portions.

The electrical junction box body 2 shown in FIG. 1 is manufactured by the following first to third steps (manufacturing method). First, the second relay block 25 will be described in an easy-to-understand manner, and then the fuse block 23 will be described in a brief manner.

In FIG. 6, the frame 7 is held by the holding device 40 in the first step. Specifically, the frame 7 is placed on the holding table 42 with the side of the frame 7 where the first opening 12 is provided located upward, and then the plurality of holding blocks 43 are operated to bring the frame 7 into a held state shown in FIG. 6. Although a plurality of drawing-in pins 44 are shown in FIG. 6, in fact, the drawing-in pins 44 are to be at a lower position in the figure before rising in the direction of the arrow P2. When the frame 7 is held by the holding device 40, the manufacturing method proceeds to the second step.

In FIGS. 7 to 9, in the second step, the cassette blocks (such as the second relay block 25) are set in the frame 7 one by one from the side where the first opening 12 is provided along the fitting direction indicated by the arrow P1. When the second step is described by taking the second relay block 25 as an example, the second relay block 25 is inserted into the frame 7 from the first opening 12 with a side close to the electric wire draw-out portion 35 where the electric wires 30 are drawn out located upward and a side close to the electronic component connection portion 36 located downward. In the second step, a worker temporarily inserts the second relay block 25 into a predetermined accommodation position of the frame 7. The term "temporarily insert" refers to a state before the frame-side lock portion 17 and the block-side lock portion 32 are fitted. In other words, an insertion up to a state in which the lock portions are in contact with one another (see FIG. 9). When a temporary insertion of the second relay block 25 is completed, the electric wires 30 are present in front of the worker (since the electric wires 30 are drawn out along the removing direction indicated by the arrow P2, the electric wires 30 are present in front of the worker). Although a work is performed by a worker trying to push the block while avoiding pushing electric wires 30 together after the temporary insertion in the related art, such a work is not necessary in the present invention. A reason for this can be seen in the following third step.

In FIGS. 7 to 11, the cassette blocks are drawn into the frame 7 by the drawing-in device 41 and then the cassette blocks are brought into a state of being fitted to the frame 7 in the third step. The third step is described by taking the second relay block 25 as an example. First, the drawing-in pins 44 are raised in the direction of the arrow P2 to bring the drawing-in pins 44 into an insertion state of being inserted into the hole portions 37 of the second relay block 25. At this time, the tip end portion 48 of the drawing-in pin 44 passes through the space between the pair of protruding portions of the jig engagement portion 38. The tip end portion 48 does not protrude outward from the annular protruding portion 50 of the hole portion 37, and is not in contact with the electric wires 30. Next, when the drawing-in pin 44 is rotated by 90 degrees, a direction of the tip end portion 48 changes from a state shown in FIG. 10 to a state shown in FIG. 15. That is, the tip end portion 48 is changed into a state in which the tip end portion 48 can be engaged with the jig engagement portion 38. Finally, when the drawing-in pin 44 is moved downward in the direction of the arrow P1 to draw the second relay block 25 into the frame 7, the frame-side lock portion 17 and the block-side lock portion 32 can be engaged with each other. That is, the second relay block 25 can be brought into a fitted state with respect to the frame 7. When the drawing-in pin 44 is moved downward in the direction of the arrow P1, since the tip end portion 48 is engaged with the jig engagement portion 38, the second relay block 25 is drawn into the frame 7.

Next, the fuse block 23 will be described in a brief manner. As shown in FIGS. 16 and 17, the fuse block 23 includes a pair of jig engagement portions 51. The pair of jig engagement portions 51 are formed on a side wall 53 of a housing 52. In the present embodiment, circular hole portions that runs through predetermined positions of the side wall 53 are formed as the jig engagement portions 51. The drawing-in pins 45 are respectively inserted into the jig engagement portions 51. In the second step of the manufacturing method, a bracket base 54 having a pair of brackets 49 (see FIG. 5) is raised in the direction of the arrow P2, and the bracket base 54 is inserted into the housing 52. Then, when the bracket base 54 slides in the direction of the arrow Q after being inserted, the drawing-in pins 45 respectively provided on the pair of brackets 49 are inserted into the pair of jig engagement portions 51 and are brought into an engaged state as shown in FIG. 17. When the bracket base 54 is moved downward (not shown) in the direction of the arrow P1 from the engaged state, since the drawing-in pins 45 are engaged with the jig engagement portions 51, the fuse block 23 is drawn into the frame 7. Although the bracket base 54 is inserted into the housing 52, the present invention is not limited thereto. That is, the fuse block 23 may be drawn into the frame 7 by the bracket base 54 rising, sliding, and moving downward outside the housing 52.

As described above with reference to FIGS. 1 to 17, according to the electrical junction box 1 in the embodiment of the present invention, since the jig engagement portion 38 is formed in each cassette block (the second relay block 25 as a representative example) of the electrical junction box body 2, the second relay block 25 can be fitted to the frame 7 by being drawn into the frame 7 by using the jig engagement portion 38. In other words, the second relay block 25 can be fitted to the frame 7 without pushing, with a hand or a hand tool as in the related art, a side of the second relay block 25 where the electric wires 30 are drawn out. Therefore, according to the electrical junction box 1 (the electrical junction box body 2), since the side where the electric wires 30 are drawn out is not pushed, the electric wires 30 can be prevented from being damaged or disconnected during a manufacturing work. Accordingly, quality of the electrical junction box 1 (the electrical junction box body 2) can be improved compared with that in the related art.

In addition, according to the manufacturing apparatus 39 and the manufacturing method according to the embodiment of the present invention, the cassette blocks can be fitted to the frame 7 without pushing, with a hand or a hand tool, the side of the cassette blocks where the electric wires 30 are drawn out. Further, a better wire harness can be provided that includes the electric connection box 1.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, an electrical junction box includes a frame and a cassette block from which a plurality of electric wires are drawn out. The frame has a side wall defining a shape of the frame, the frame having a first opening and a second opening provided at two ends of the side wall. The cassette block is configured to be attached to the frame from the first opening along a first direction and the plurality of electric wires are drawn out along a second direction when the cassette block is attached to the frame, the first direction being a direction oriented toward the second opening from the first opening, the second direction being another direction oriented toward the first opening from the second opening. The cassette block has a jig engagement portion. The jig engagement portion is configured such that a jig or device inserted into the cassette block from a side of the second opening along the second direction engages with the jig engagement portion and the cassette block is drawn into the frame by the jig or device inserted into the cassette block moving in the first direction.

According to the electrical junction box having the above-described configuration, since the jig engagement portion is formed in the cassette block, the cassette block can be fitted to the frame by being drawn into the frame by using the jig engagement portion. In other words, the cassette block can be fitted to the frame without being pushed, with a hand or a hand tool, on a side where the electric wires are drawn out. According to the present invention, since the side where the electric wires are drawn out is not pushed, the electric wires can be prevented from being damaged or disconnected during a manufacturing work. Therefore, quality of the electrical junction box can be improved compared with those in the related art.

The jig or device inserted into the cassette block may engage with the jig engagement portion by the jig or device rotating about an axis along the first and second directions.

With this configuration, the jig or device engages with the jig engagement portion when the jig or device is rotated after the jig or device is inserted into the cassette block. Therefore, the cassette block can be easily drawn into the frame without using a jig or device or a jig engagement portion having a complicated structure or mechanism.

The jig or device inserted into the cassette block may engage with the jig engagement portion by the jig or device sliding along yet another direction orthogonal to the first and second directions.

With this configuration, the jig or device engages with the jig engagement portion when the jig or device slides after the jig or device is inserted into the cassette block. Therefore, the cassette block can be easily drawn into the frame without using a jig or device or a jig engagement portion having a complicated structure or mechanism.

The jig engagement portion may be provided in a hole portion of the cassette block, the hole portion being configured such that the jig or device can be inserted into or removed from the hole portion.

With this configuration, since the jig engagement portion is the hole portion of the cassette block, the cassette block can be drawn into the frame without using a jig or device or a jig engagement portion having a complicated structure or mechanism. According to the present invention, since the jig or device can be inserted into or removed from the hole portion, the jig or device can be protected by being separated from a functional portion of the cassette block.

The hole portion may run through the cassette block up to a portion from which the plurality of electric wires are drawn out, and is formed with an annular protruding wall at an opening portion of the hole portion, the annular protruding wall being provided on a same side of the cassette block as the portion from which the plurality of electric wires are drawn out and being configured to separate the jig or device from the plurality of electric wires.

With this configuration, since the hole portion that runs through the cassette block up to a position of the electric wire draw-out portion is formed with the annular protruding portion (annular protruding wall) at an opening portion of the hole portion provided on the same side of the cassette block as where the electric wire draw-out portion is provided, the electric wires drawn out from the electric wire draw-out portion and the jig or device can be separated. Therefore, the electric wires can be protected. In addition, according to the present invention, since the annular protruding portion is not a long cylinder but an annular protruding portion (that is, the annular protruding portion being a short/low cylinder), the annular protruding portion does not interfere with an insertion work of the electric wires, and as a result, the good workability can be maintained.

A position where the hole portion is provided may vary depending on types of the cassette block.

With this configuration, arrangements of the hole portion having the jig engagement portion varies corresponding to types of the cassette blocks. Therefore, the hole portions can have a function of preventing an erroneous assembly.

A manufacturing apparatus for manufacturing the electrical junction box may include a holding device and a drawing-in device. The holding device may be configured to hold the frame. The drawing-in device may be configured to attach the cassette block to the frame by drawing the cassette block into the frame. The drawing-in device may include the jig or device configured, when the cassette block is attached to the frame, to be inserted into the cassette block from a side of the second opening along the second direction, then to engage with the cassette block and to move toward the first direction.

According to the manufacturing apparatus of the electrical junction box having the above-described configuration, it is possible to provide a manufacturing apparatus for fitting the cassette block to the frame without the cassette block being pushed, with a hand or a hand tool, on a side where the electric wires are drawn out. According to the present invention, since the side where the electric wires are drawn out is not pushed, the electric wires can be prevented from being damaged or disconnected during a manufacturing work. Therefore, quality of the electrical junction box can be improved compared with that in the related art.

According to yet another aspect of the embodiments described above, a manufacturing method of an electrical junction box includes holding a frame by a holding device, the frame having a side wall defining a shape of the frame, and the frame having a first opening and a second opening provided at two ends of the side wall, putting a cassette block, from which a plurality of electric wires being drawn out, in the frame from the first opening along a first direction such that the plurality of electric wires are drawn out in a second direction, the first direction being a direction oriented toward the second opening from the first opening, the second direction being another direction oriented toward the first opening from the second opening, and attaching the cassette block to the frame by drawing the cassette block into the frame. The attaching includes a jig or device being inserted into the cassette block from a side of the second opening along the second direction, the jig or device getting engaged with a jig engagement portion of the cassette block after being inserted into the cassette block and the jig or device moving in the first direction, thereby attaching the cassette block to the frame.

According to the manufacturing method of an electrical junction box having the above-described configuration, it is possible to provide a manufacturing method for fitting the cassette block to the frame without the cassette block being pushed, with a hand or a hand tool, on a side where the electric wires are drawn out. According to the present invention, since the side where the electric wires are drawn out is not pushed, the electric wires can be prevented from being damaged or disconnected during a manufacturing work. Therefore, quality of the electrical junction box can be improved compared with those in the related art.

According to still another aspect of the embodiments described above, a wire harness includes the electrical junction box provided at a terminal of the wire harness and is to be routed in an automobile.

According to the wire harness having the above-described configuration, a better wire harness can be provided by including the electrical junction box having the above effects.

What is claimed is:

1. An electrical junction box including:
    a frame and a cassette block from which a plurality of electric wires are drawn out,
    wherein the frame has a side wall defining a shape of the frame, the frame having a first opening and a second opening provided at two ends of the side wall,
    wherein the cassette block is configured to be attached to the frame from the first opening along a first direction and the plurality of electric wires are drawn out along a second direction when the cassette block is attached to the frame, the first direction being a direction oriented toward the second opening from the first opening, the second direction being another direction oriented toward the first opening from the second opening,
    wherein the cassette block has a jig engagement portion, and
    wherein the jig engagement portion is configured such that a jig or device inserted into the cassette block from a side of the second opening along the second direction engages with the jig engagement portion and the cassette block is drawn into the frame by the jig or device inserted into the cassette block moving in the first direction.

2. The electrical junction box according to claim 1,
    wherein the jig or device inserted into the cassette block engages with the jig engagement portion by the jig or device rotating about an axis along the first and second directions.

3. The electrical junction box according to claim 1,
    wherein the jig or device inserted into the cassette block engages with the jig engagement portion by the jig or device sliding along yet another direction orthogonal to the first and second directions.

4. The electrical junction box according to claim 2,
    wherein the jig engagement portion is provided in a hole portion of the cassette block, the hole portion being configured such that the jig or device can be inserted into or removed from the hole portion.

5. The electrical junction box according to claim 4,
    wherein the hole portion runs through the cassette block up to a portion from which the plurality of electric wires are drawn out, and is formed with an annular protruding wall at an opening portion of the hole portion, the annular protruding wall being provided on a same side of the cassette block as the portion from which the plurality of electric wires are drawn out and being configured to separate the jig or device from the plurality of electric wires.

6. The electrical junction box according to claim 4,
    wherein a position where the hole portion is provided varies depending on types of the cassette block.

7. A manufacturing apparatus for manufacturing the electrical junction box according to claim 1 including:
    a holding device and a drawing-in device,
    wherein the holding device is configured to hold the frame,
    wherein the drawing-in device is configured to attach the cassette block to the frame by drawing the cassette block into the frame, and
    wherein the drawing-in device includes the jig or device configured, when the cassette block is attached to the frame, to be inserted into the cassette block from the side of the second opening along the second direction, then to engage with the cassette block and to move toward the first direction.

8. A manufacturing method of an electrical junction box including:
    holding a frame by a holding device, the frame having a side wall defining a shape of the frame, and the frame having a first opening and a second opening provided at two ends of the side wall,
    putting a cassette block, from which a plurality of electric wires being drawn out, in the frame from the first opening along a first direction such that the plurality of electric wires are drawn out in a second direction, the first direction being a direction oriented toward the second opening from the first opening, the second direction being another direction oriented toward the first opening from the second opening, and
    attaching the cassette block to the frame by drawing the cassette block into the frame,
    wherein the attaching includes: a jig or device being inserted into the cassette block from a side of the second opening along the second direction; the jig or device getting engaged with a jig engagement portion of the cassette block after being inserted into the cassette block; and the jig or device moving in the first direction, thereby attaching the cassette block to the frame.

9. A wire harness including the electrical junction box according to claim 1,
    wherein the electrical junction box is provided at a terminal of the wire harness and the wire harness is to be routed in an automobile.

* * * * *